INVENTOR
JOSEPH P. PAWLETKO
BY John P. Doritz
ATTORNEY

United States Patent Office
3,092,816
Patented June 4, 1963

3,092,816

MAGNETIC DRUM STORAGE APPARATUS

Joseph P. Pawletko, Endicott, N.Y., assignor to International Business Machines Corporation, New York, N.Y., a corporation of New York Filed June 16, 1959, Ser. No. 820,622
1 Claim. (Cl. 340—174.1)

This invention relates to storage devices for data processing machines and particularly to dynamically operated storage devices of increased storage capacity.

The many components that go to make up a data processing machine are designed to operate at a particular frequency and generally perform in an optimum manner only at the frequency at which they are designed to operate. As a general rule, lower frequencies enable lower cost components to be utilized. Thus, the over-all cost of a machine designed to operate at 125 kilocycles, for example, will generally be less than a machine designed to operate at 250 kilocycles. This is a result of the lower component cost for the lower frequency.

Recent advances in the technology of recording on magnetic drums have made it possible to economically record and read back information at a greater bit density than heretofore possible. If the bit density in a track of a magnetic drum is doubled and the drum is rotated at the same speed to give the same access time to any piece of information in the track, then the frequency of the machine is normally doubled. This dictates more expensive equipment. An obvious solution is to slow up the revolution rate of the drum such that the frequency is brought back to one enabling more economical components to be used. This however deteriorates the quality of the recording and more drastically the quality of the signal read back from a recording. In addition, such an approach causes the access time to any piece of information stored on the track around the drum surface to be increased. Since access time in data processing machines is one of the more important criteria, the latter approach is often untenable.

An object of the present invention is to provide an improved data storage apparatus of the cyclically operable type with increased capacity.

Another object of this invention is to provide a data processing machine with an improved magnetic drum type storage device of increased capacity and low access time.

Another object of this invention is to provide a data processing machine with a magnetic drum storage device having low access time and having a frequency in a range enabling economical components to be utilized.

Still another object of this invention is to provide a storage device of the magnetic drum type having low access time in conjunction with a relatively low frequency rate of operation, while providing a large storage volume.

According to a preferred embodiment of the present invention, a data processing machine is provided with a magnetic drum type data storage device wherein a first group of data positions in a single band around the circumference of the drum is interleaved with a second group of data positions. The first digit of a first word of data is followed in sequence by a first digit of a second word of data, the second digit of the first word follows the first digit of the second word, the second digit of the second word follows the second digit of the first word, etc., such that two words of data stored around the circumference of the drum in a single band are interleaved with one another. A pair of timing pulse generators out of phase with one another are provided, such that one generator is effective to control transducing means to select one of the interleaved words, while the other timing pulse generator is effective to control the transducing means to select the other of two interleaved words. The addressing mechanism of the data processing machine selects one or the other of the two timing pulse generators in accordance with the address of the desired word. In this manner, a track on the magnetic drum stores twice the number of bits and thus twice the data that would normally be stored in the conventional manner at the same frequency. Assuming that the frequency of a machine is 125 kilocycles, then a particular word of data is read from the drum at the bit rate of 125 kilocycles. By interleaving or interlacing another word with the first word, the bit density around the drum is doubled, yet the frequency of operation of the machine remains the same. Thus, by selecting one of the two timing pulse generators, the particular word sought on the drum may be selected and read at the basic rate of 125 kilocycles. This enables a more extensive use of optimum programming. That is, in the sequence of handling data in a data processing application, it is desirable that the piece of information required at a particular instant in the solution of a problem be available at a reading head the instant that it is required or as soon thereafter as possible. With two words of data interleaved on the same band of the drum, there are twice as many choices of immediately accessible words at any particular time as with the bits or characters of a word recorded sequentially on the storage medium. With the present invention, the possibilities of optimum programming for a data processing machine are improved and the storage capacity of the magnetic drum is doubled while the basic frequency of the machine is maintained at a low level enabling the use of economical components.

Accordingly, a further object of this invention is to provide a data processing machine with greater optimum programming potentialities.

The foregoing and other objects, features and advantages of the invention will be apparent from the following more particular description of a preferred embodiment of the invention, as illustrated in the accompanying drawings.

Figure 1:
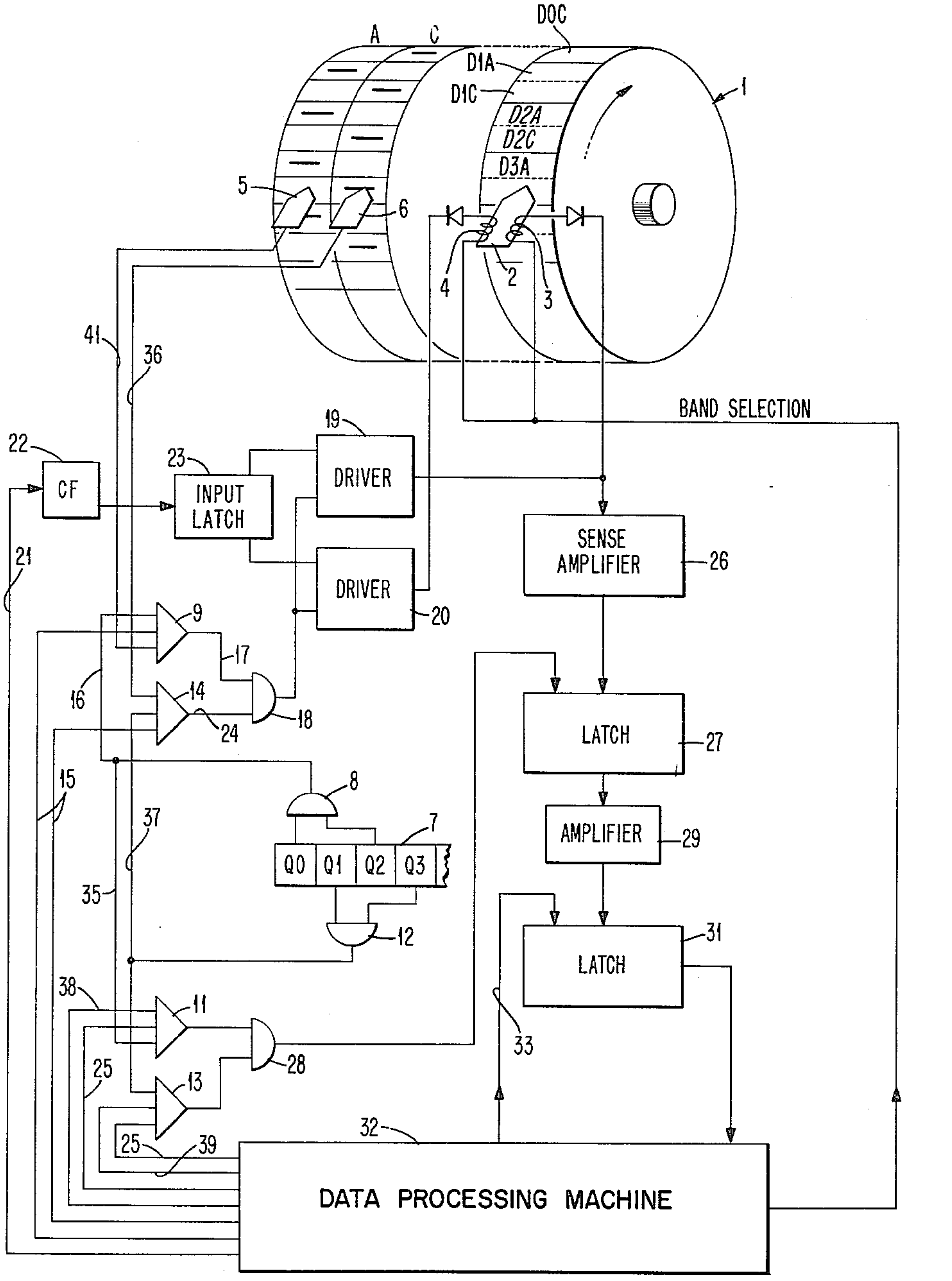
FIG. 1 is a block diagram of a magnetic drum storage apparatus for a data processing machine constructed in accordance with the present invention.

Referring to FIG. 1, there is shown a data processing machine including a cyclically operable storage medium in the form of a magnetic drum 1 having a read-record head 2 cooperating with a magnetic recording surface in the form of a track about the drum 1 to record data in or on the surface of the drum and to read data from the surface of the drum. The magnetic recording head 2 is equipped in the usual manner with a sense winding 3 and a record winding 4. Timing tracks A and C are recorded on the drum 1 and have read heads 5 and 6 respectively associated therewith. The magnetic spots recorded in track A alternate with the magnetic spots recorded in the track C such that the tracks A and C cooperating with the reading heads 5 and 6 form a pair of timing pulse generators, generating timing pulses of two different phases. As may be seen from the information track on the drum, the set of timing pulses from track A is of such a phase as to select digit 1A, digit 2A, digit 3A, etc., while the set of timing pulses from track C is of such a phase as to select digit 1C, digit 2C, etc. and that digit 1A, digit 2A, digit 3A, etc. may form one word of data while digit 1C, digit 2C, digit 3C, etc. may form another entirely different word of data. A magnetic drum of the type employed in the present invention with timing tracks, information tracks, sense or read and record heads and a data processing machine in which such a magnetic drum storage device is employed is shown and described in detail in F. E. Hamilton et al. application Serial No. 544,520, filed November 2, 1955, and assigned to the present assignee. The present invention is adapted to be used in a machine of the type shown in the above-mentioned Hamilton et al. application and this Hamilton et al. application may be readily adapted to use the present invention.

Addressing means including an address register 7 are provided for receiving a number indicating the address of information on the drum 1. The register 7 sets up circuits which in turn both select the particular track or band in which the desired information word is located and dynamically select the word from the track by switching and timing circuits. The details of such suitable structure is shown in the above-identified Hamilton et al. application. Address register 7 of FIG. 1 may be constructed exactly as the address register of the above-identified Hamilton et al. application. The Q0, Q1, Q2 and Q3 positions of address register 7 may correspond to the Q0TH, Q1TH, Q2TH and Q3TH position of the address register of the Hamilton et al. application. The code used in this register may, by way of example, be a biquinary code, that is, a code in which two out of seven elements represent any one of the ten decimal digits. The Q0 and Q2 positions of the address register 7 are mixed together at OR circuit 8 and the output of OR circuit 8, which manifests a signal if either the Q0 position or the Q2 position contained a bit of information, is fed to inputs of AND circuits 9 and 11 over lines 16 and 35, respectively. The outputs from the Q1 and Q3 positions of the address register 7 are mixed together at OR circuit 12 and fed to inputs of AND circuits 13 and 14. Thus, if either a zero or a two is present in the thousands order of the address register 7, AND circuits 9 and 11 each have one of their three inputs energized so that if the other two inputs are energized, the switch will pass a pulse to its output. The second input to each of the AND circuits 9 and 11 is the output from the head 5 on the A track of the drum. It will be recalled that this is the timing pulse generator of the particular phase to select digits 1A, 2A, 3A, etc. from a storage track on drum 1. If it is desired to write or record information on the drum 1, the record line 15 at the inputs of switches 9 and 14 are energized. Thus, at switch 9, if a zero or two bit appears in the address register 7, the input line 16 to AND circuit 9 is energized and with a record signal on input line 15, a signal will be produced at the output of AND circuit, or switch 9 on line 17 in accordance with the timing pulses from track A of the drum. The output pulses on line 17 are shown at J in FIG. 2. These pulses are fed through OR circuit 18 to a pair of driver circuits 19 and 20. The driver circuits 19 and 20 are connected to the windings 3 and 4, respectively, of magnetic head 2. Data is fed to the storage apparatus over line 21. If information on line 21 indicates that a bit is present at a particular digit position, the driving circuit 19 is energized such that a current pulse is passed through winding 3 to write a bit on the drum at the required location. If the input information on line 21 indicates that no bit is to be written by the head at a particular location, then the driver circuit 20 is energized to pass current through winding 4 on head 2 such that any information previously written in this location is erased. The information from line 21 is fed through an amplifier 22 of the cathode follower type to a latch circuit 23 where the information is temporarily stored and while temporarily stored, controls the driver circuits 19 and 20. The information remains in latch 23 only for one digit time.

If a Q1 or a Q3 is present in the address register 7, indicating a different address than that just discussed, the output of the address register will energize one of the inputs to the AND circuit, or switch 14. If a record operation is called for, e.g. line 15 energized, timing pulses from track C will pass over line 36 and through AND circuit 14, over line 24 and through OR circuit 18 to drivers 19 and 20. The driver circuits 19 and 20 are now energized in accordance with the timing pulses from the C track of the drum and as before accordingly to the input information on line 21 as temporarily stored in latch 23. The latch 23 governs which of the driver circuits 19 or 20 will be energized in response to the pulse at the output of OR circuit 18. It may thus be seen that the output of OR circuit 18 will correspond to the A timing pulses from the A track of the drum or the C timing pulses from the C timing track of the drum depending on whether a Q0 or Q2, or a Q1 or Q3 position of the address register 7 is energized. Thus, according to the address standing in the address register 7, either one or the other of the two sources of timing pulses will be selected and a word or words of data will be recorded on the drum 1 in one phase or the other depending on the address in register 7. Both phases may be used, but at different times in order to interleave data on a single track of the drum 1.

When reading or sensing data on the drum 1, the switches 11 and 13 are utilized in a manner similar to that described above for switches 9 and 14. That is, a pair of timing pulse generators are provided to operate out of phase with one another and are made to selectively control the transducing means associated with drum 1 in accordance with the address standing in register 7. Although the tracks A and C with the associated circuitry may be satisfactory for the timing pulse generators for sensing data, it is preferable to provide a pair of generators producing sets of pulses at the relative times shown at O and P in FIG. 2. These pulses may be referred to as B and D pulses and may be generated in the same manner as are the A and C timing pulses referred to above. These B and D timing pulse generators are generally indicated as part of the data processing machine 32 and may be constructed exactly like the B and D pulse generators shown at FIGS. 53*c* through 53*f* of the above-identified Hamilton et al. application. The B pulses are applied to switch 11 over line 38 while the D pulses are applied to switch 13 over line 39. A read signal on lines 25 controls another of the three inputs to each AND circuit 11 and 13. The third input to each AND circuit 11 and 13 is supplied from address register 7. Depending on the content of address register 7, either switch 11 or switch 13 is selected and with a read signal will pass either the B timing pulses or the D timing pulses to OR circuit 28. A bit in the Q0 or Q2 position of the register will be effective to select switch 11 for passing B timing pulses while a bit in the Q1 or Q3 position will be effective to select switch 13 to pass D timing pulses.

The output from the drum 1 through the read winding 3 of head 2 is passed through a sense amplifier 26 and from the sense amplifier is fed to a latch circuit 27. Coincidence of an output from amplifier 26 and an output from OR circuit 28 at latch 27 is effective to temporarily store the sensed information in latch 27. The particular information that will control the setting of the latch 27 is governed by the output of OR circuit 28, which OR circuit 28 is fed by switches 11 and 13 and will have a pulse of one phase or the other depending on the content of the address register 7. The output from the latch 27 is fed through an amplifier 29 and from the amplifier 29 to a second latch circuit 31 from which the data may be taken to any part of the data processing machine 32 as desired. The data processing machine with which the above-described apparatus is used may select, in any well-known manner, a particular track or band around the drum 1 on which it is desired to record or from which it is desired to read information and may also select, in any well-known manner, the particular segment or location of the band for recording on or reading from. For a more detailed understanding of a machine with which the present invention is useful and for a more detailed explanation of the several individual components, reference is made to the above-identified Hamilton et al. application. In order to employ the present invention in the structure of the Hamilton et al. application, the following changes are required in the Hamilton et al. structure: The output from OR circuit Q3, B0TH should be disconnected at FIG. 71*d* and connected to the OR circuit 12 in FIG. 1 of the present application as shown. The Q2 line should be disconnected from the OR circuit in FIG. 71*d* and connected to the OR circuit 8 as shown in FIG. 1 of the present application. The Q0TH line at FIG. 59*a* corresponds to the line from the Q0 position of address register 7 in the present application. The Q1TH line of FIG. 59*a* of the above-identified Hamilton et al. application corresponds to the Q1 output position of address register 7 in the present application. The selection of the magnetic heads associated with drum 1 in the present application is performed in the same manner as in the above-mentioned Hamilton et al. application, the only modification being that either one or the other of two sources of timing pulses is utilized, depending on which of the interlaced positions on the drum it is desired to record into or read from. The showing of the timing tracks A and C in FIG. 1 is schematic in nature for the purpose of simplifying an understanding of the present invention. The detailed manner in which A and C timing pulses may be generated is shown in FIGS. 54*c* and 54*d* of the above-identified Hamilton et al. application.

Figure 2:
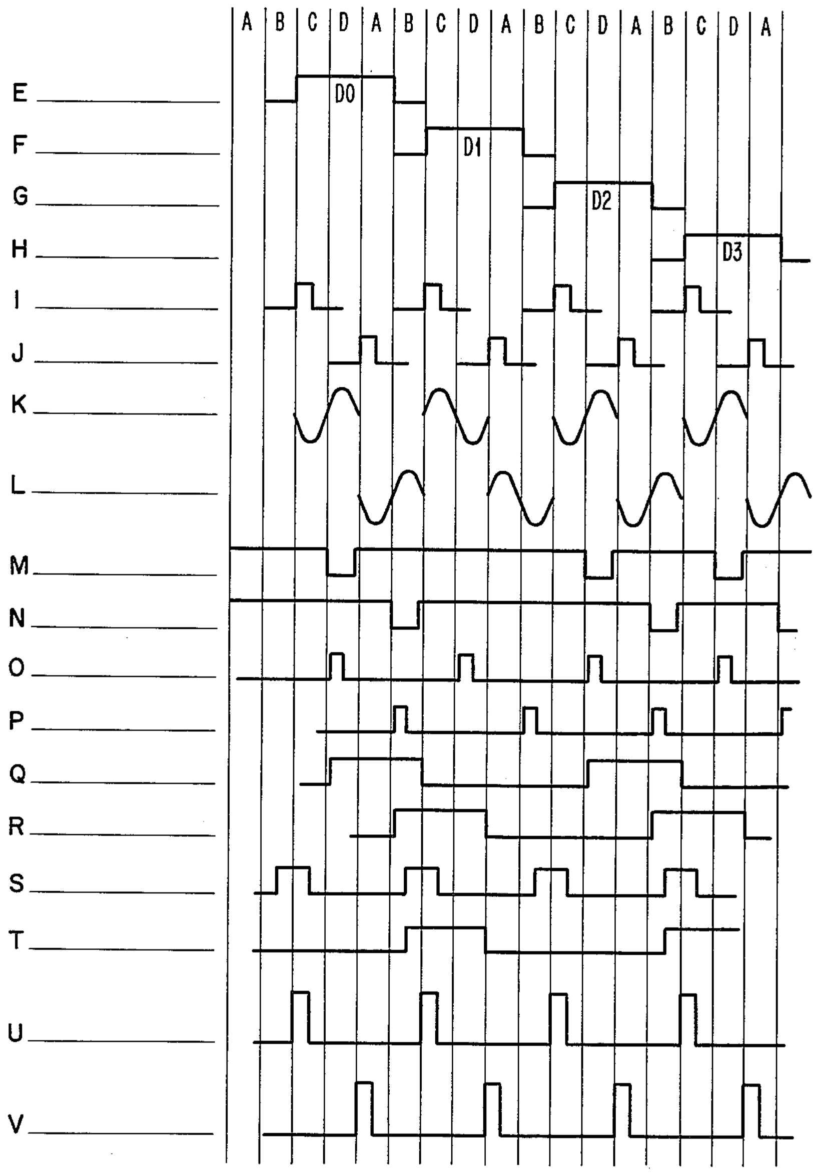
FIG. 2 is a group of waveforms to a common time base found at various points throughout the arrangement of FIG. 1.

Referring now more specifically to FIG. 2 of the present application in conjunction with FIG. 1, the waveforms shown at E, F, G and H represent the timing sequence in which digit 0, digit 1, digit 2 and digit 3 occur as drum 1 rotates. The waveform at I shows the timing pulses generated by the timing track C, read by head 6 and transmitted over line 36 to switch 14. The waveform at J shows the timing pulses from track A of drum 1 as read by head 5 and transmitted over line 41 to switch 9. The waveforms at K illustrate, respectively, the signals produced in winding 3 from a bit of information recorded in the D0C position, no bit of information recorded in the D1C position, a bit of information recorded in the D2C position, and a bit of information recorded in the D3C position as controlled by the pulses shown at I above and as read by the head 2. The pulses shown at K are those at the output of head 2 as applied to sense amplifier 26. The pulses shown at L in FIG. 2 are the pulses generated in head 2 in response to signals recorded in accordance with the timing signals shown at J in FIG. 2. The pulses shown at L in FIG. 2 are applied to the sense amplifier 26, as are the pulses shown at K. The pulses shown at M in FIG. 2 are the pulses produced at the output of the amplifier 26 in response to the signals shown at K. The amplifier 26 both amplifies and shapes pulses taken from the magnetic head 2. The pulses shown at N are the pulses produced at the output of the amplifier 26 in response to the signals shown at L. The amplifier 26 amplifies and shapes all the signals from the information track of drum 1 without regard to which timing pulse generator is controlling the sampling of the data. The output from amplifier 26 is fed to the latch 27 along with the pulses from OR circuti 28, which pulses from OR circuit 28 are of one phase or another depending on the address in address register 7. The pulses from OR circuit 28 in response to a zero or a two in address register 7 are as shown at O in FIG. 2. With this condition, information appearing at the output of amplifier 26 is sampled and sets up latch 27 only when a pulse as shown at O in FIG, 2 simultaneously appears. If a bit is present in the Q1 or Q3 position of address register 7, information at the output of amplifier 26 is effective to set up latch 27 only as it occurs simultaneously with a pulse shown at P in FIG. 2. The waveform shown at Q in FIG. 2 is the output of the latch 27, as set up by the information signals from amplifier 26 and timing pulses as passed through OR circuit 28 and shown at O in FIG. 2. The waveform shown at R in FIG. 2 is the output of latch 27 as set up in response to information signals from emplifier 26 and timing pulses as shown at P in FIG. 2. The pulses shown at S in FIG. 2 are the pulses supplied by the data processing machine 32 over line 33 to the latch 31. The output of latch 27 is taken through the amplifier 29 to the latch 31, and when appearing simultaneously with a signal on line 33, serves to set up latch 31. The waveform shown at T in FIG. 2 is the output of latch 31 as set up by a sample signal shown at S in FIG. 2 in conjunction with a signal through amplifier 29. The waveforms shown at U and V in FIG. 2 are the reset pulses that reset latch 27.

While the invention has been particularly shown and described with reference to a preferred embodiment thereof, it will be understood by those skilled in the art that various changes in form and details may be made therein without departing from the spirit and scope of the invention.

What is claimed is:

In a data processing machine, (*a*) a cyclically movable storage medium containing a plurality of addressable locations, (*b*) a transducer disposed adjacent said movable storage medium to record data and read data at preselected addressable locations passing adjacent said transducer in accordance with the address pertaining to said data, (*c*) a first source for generating first timing signals wherein said timing signals occur at a frequency equal to the frequency of passage of said addressable areas adjacent said transducer and which occur for a fractional part of the time during which an addressable area is adjacent said recording transducer, (*d*) a second source for generating second timing signals wherein said second timing signals have a frequency equal to the frequency of said first timing signals and which occur for a fractional part of the time during which an addressable area is adjacent said recording transducer and at a different point in time from said first series of timing signals, (*e*) an address register for data indicative of the highest order digit of the address at which data is to be read or recorded, (*f*) means connected to said highest order address register and responsive to predetermined data digits contained therein for gating data to be read or recorded with said first series of timing pulses, (*g*) and means connected to said highest order address register and responsive to predetermined data digits contained therein for gating data to be read or recorded with said second series of timing pulses, (*h*) whereby sequentially related data is interlaced in said sequential address locations as a function of the highest order digit of said address register.

References Cited in the file of this patent

UNITED STATES PATENTS

| | | |
|---|---|---|
| 2,794,066 | Mullin | May 28, 1957 |
| 2,797,402 | Duffey | July 25, 1957 |
| 2,845,609 | Newman | July 29, 1958 |
| 2,904,776 | Neff | Sept. 15, 1959 |
| 2,931,572 | Dirks | Apr. 5, 1960 |
| 2,926,338 | Bensky | Feb. 23, 1960 |

FOREIGN PATENTS

| | | |
|---|---|---|
| 216,876 | Australia | Aug. 20, 1958 |